United States Patent Office 3,360,599
Patented Dec. 26, 1967

3,360,599
PREPARATION OF COHERENT BLOCK COPOLYMER FILMS OF HIGH TENSILE STRENGTH AND EXTENSIBILITY
David D. Nyberg, San Pedro, and Joseph T. Bailey, Torrance, Calif., assignors to Shell Oil Company, New York, N.Y., a corporation of Delaware
No Drawing. Filed Nov. 6, 1963, Ser. No. 321,812
4 Claims. (Cl. 264—216)

This invention relates to the preparation of coherent block copolymer film. More particularly, it relates to a process for improving the tensile strength and other properties of films prepared from latices of block copolymers.

The preparation of films from polymers, particularly elastomers, may be effected by two principal means comprising molding or extrusion operations on the one hand or film formation by means of latices on the other. The choice of the method to be employed will depend on numerous economic factors, but for certain applications involving thin-walled articles of complex shape, or the application of the layers to porous substrates, or the application of thin layers of polymer highly diluted with fillers and/or functional materials, the process of forming films deposited from latices is the most attractive. With ordinary rubbers, either natural or synthetic, useful films are not normally produced simply by removal of the water phase. Chemical reaction, brought about by the addition of so-called curing agents, the nature of which may vary with different types of elastomer, is necessary to impart sufficient strength to the film. This is sharply differentiated from the problem encountered when the polymer comprising the latex is a block copolymer containing at least 3 polymeric blocks, the two non-conterminous terminal blocks of which are of a non-elastomeric nature and at least one other (i.e., the middle) of which is elastomeric in character. Block copolymers of this general type have received considerable attention lately due to their favorable combination of physical properties. For example, when the optimum ratio of non-elastomeric to elastomeric blocks is present, the block copolymers exhibit what are referred to as "self-curing" properties. By this is meant that the block copolymer exhibits the properties normally met in a polymer especially a conjugated diene elastomer, which has been cured with the usual vulcanizing agent such as sulfur containing compounds. The lack of necessity for vulcanizing such polymers is of great utility for many purposes such as in the formation of molded articles, films, coatings or impregnated articles or in the preparation of latices, paints, adhesives and the like. However, the films prepared from latices of such block copolymers have been found to have relatively poor tensile strength and also relatively low elongation at break.

It is an object of the present invention to improve the properties of block copolymer films. It is a particular object of the present invention to improve the physical properties of block copolymer films prepared from latices. It is a special object of the invention to improve the tensile strength and/or elongation at break of such films. Other objects will become apparent during the following detailed description of the invention.

Now, in accordance with the present invention, a process for the improvement in the tensile strength and other properties of films prepared from latices of block polymers have been devised which comprises laying down a film of the latex comprising certain block polymers as defined more fully hereinafter, removing water therefrom, and annealing the film so formed at a temperature between about 50° C. and 160° C. for a period of time from about 1 minute to about 120 minutes, whereby the tensile strength and/or elongation thereof is substantially improved.

More particularly, the block copolymers with which the present invention is concerned have the general configuration

A—B—A wherein each A is an independently selected non-elastomeric polymer block having an average molecular weight of 2,000–100,000, the total A content being at least 5% by weight of the polymer and B is an elastomeric polymer block having an average molecular weight between about 25,000 and 1 million. The blocks A are independently selected non-elastomeric polymer blocks having an average molecular weight of 2,000–100,000 and a glass transition temperature above about 25° C. and the blocks B are independently selected elastomeric polymer blocks having an average molecular weight between about 25,000 and 1 million, the glass transition temperature being below about 10° C. Preferably, the block polymers are those in which the elastomeric polymer block is that of a conjugated diene. Still more preferably, the block polymers are those in which the end blocks comprise polymer blocks of an alkenyl aromatic hydrocarbon connected by a block of a polymerized conjugated diene, the latter being one capable of having a cis 1,4-content of 80–100%, as exemplified by polyisoprene. These block polymers include a special variety in which at least one of the blocks may be referred to as a "tapered" block in which the block has an increasing proportion from one end to the other of units of a monomer promoting either elastomeric or non-elastomeric properties in the block.

For the purpose of the present invention, the definition of an elastomeric substance is that expressed in ASTM Special Technical Bulletin No. 184 as follows:

"A substance that can be stretched at room temperature to at least twice its original length and, after being stretched and the stress removed returns with force to approximately its original length in a short time."

The block from which the block polymers of any one of the general categories may be derived may contain blocks of alpha olefins, and copolymer blocks thereof of either rubbery or plastic varieties, depending upon the ratio of olefins in such copolymers as known in the art. For example, rubbery copolymer blocks of ethylene and propylene are formed when the ethylene content is 60–70%. Preferred non-elastomeric ethylene-propylene copolymer blocks are those having 80–95 mol percent ethylene. The elastomeric blocks are preferably those of aliphatic conjugated dienes such as isoprene, methylisoprene, butadiene, copolymers of styrene-butadiene and of butadiene-acrylonitrile.

The non-elastomeric blocks, constituting at least about 5% by weight (preferably 15–30%) of the polymer, may comprise homopolymers of the lower olefins or of styrene, methyl styrene, methyl methacrylate and the like. Vinyl aromatic polymer blocks are included and are preferably those made from one or more monovinyl aromatic hydrocarbons of the benzene series such as styrene, vinyl toluene, etc. Suitable block polymers which typify the classes of materials considered herein are the following:

Polystyrene—polyisoprene—polystyrene
Polystyrene—polybutadiene—polystyrene

Hydrogenated derivatives of these block polymers may be used as well.

The block polymers used in the process of this invention may be made by processes involving the sequential formation of the individual blocks. More specifically, the polymers are formed, for example, by polymerizing styrene in the presence of a lithium based initiator or a Ziegler type catalyst, introducing isoprene and permitting the polymerization to continue until all of the monomer is consumed and thereafter introducing a second portion of styrene.

The latices from which the subject films are laid down may be prepared by emulsifying block polymer cements with water and an emulsifying agent and thereafter removing the cement solvent. The cements from which the latices are prepared, preferably contain between about 5% and about 20% by weight of the block copolymer. The water phase contains an emulsifying amount of an emulsifying agent of either non-ionic, cationic or anionic types, the latter being preferred; and of these, soaps are considered to be optimum, particularly, the alkali metal soaps of monocarboxylic acids such as $C_{12-20}$ fatty acids, rosin acids, tolyl acids and the like are chiefly employed. Proprietary emulsifying agents may be employed in place thereof or in addition thereto.

An amount of water sufficient to cause the formation of an emulsion of the proper consistency is utilized, preferably such that the ratio of block copolymer to water is between about 1–10 and 50–50 by weight. Emulsification can take place by any of the well known means for this purpose, such as with a colloid mill or other high shear dispersing device. The amount of emulsifying agents required for suitable emulsification usually ranges from about 5–30 parts by weight per hundred of polymer, but the amount that is contained in the concentrated latex eventually isolated is most preferred when it is below about 5 p.h.r., 1–3 p.h.r. being most suitable.

Following the formation of the emulsion, the solvent of the block copolymer cement is then removed by simple flashing techniques or by creating and collapsing a foam. The foam comprises evaporated solvents in intimate admixture with an aqueous liquid phase and rubber which has now been transferred from its original solvent cement phase into the water in the form of finely dispersed particles.

If the solvent evaporation does in fact result in a stable foam formation, this can actually be capitalized upon by encouraging rather than restricting foaming, thus permitting all of the emulsion to be converted into foam which is thereafter collapsed by lowering the temperature to the extent that the vaporized solvent is condensed to a liquid phase which is separate from the aqueous phase now containing suspended polymer particles in the form of a dilute latex.

The precise temperature at which foam is formed or solvent is flashed off will depend largely upon the boiling point of the solvent as well as the temperature to which the composition is to be cooled. The dilute latex formed by this or similar processes is preferably concentrated by removal of part of the serum phase such as by centrifuging so as to isolate a concentrated latex from a serum containing a substantial proportion of the original emulsifier content.

The resulting latex, now containing as the dispersed phase the block copolymer will preferably contain between about 25% and 70% by weight of polymer based on the total latex weight.

The optimum combination of physical properties for many purposes is achieved by a relatively restricted configuration of the type of block copolymer having non-elastomeric end blocks and an elastomeric center polymer block, especially when the average molecular weight of each of the non-elastomeric end blocks is between about 8,000 and 45,000 and the center block has an average molecular weight of between about 35,000 and 150,000.

The average molecular weight of the center elastomeric block may be extended if a compatible polymer extending oil is present. In this case, when extending oil is present in an amount $x$ parts by weight per 100 parts of a block copolymer, where $x$ is a number between 0 and 100, the average molecular weight of the conjugated diene center block may be between about $350Y$ and $1500Y$, where $Y$ is a number between 100 and $100+x$. Hence, it will be understood that the latices of the present invention may be modified by the presence of hydrocarbon extending oils and by the presence of pigments such as carbon black, titanium dioxide and other well-known polymer pigmenting materials. Still more preferably, the non-elastomeric terminal blocks should have average molecular weights between about 10,000 and 33,000 while the average molecular weight of the block having elastomeric properties is defined by the formula $500Y$ and $1250Y$, wherein $Y$ is defined as above. Under these circumstances, the block copolymers treated according to the annealing process of this invention will yield the optimum combination of tensile strength, good processability and high elongation.

The latices may be modified by the presence of other polymers, particularly elastomers such as the polymers of conjugated dienes including polyisoprene and polybutadiene. In order for the annealing process of this invention to be effective however, the block copolymers described hereinbefore could be present in an amount of at least 25% by weight of the total polymer content of the latex. Moreover, the latex may be modified with other materials such as wax and asphalt for particular utility. Compositions such as the latter are useful for the coating of cartons and the like to form water impermeable surfaces thereon, to improve their tear strength and for other purposes.

The process of the invention, following formation of the latex as described hereinbefore comprises the initial step of laying down a film on any suitable surface from the latex and removing the water therefrom. Water is usually removed by evaporation either at ambient temperature or by the use of heating. The film may be, for example, laid on a moving belt and passed through a tunnel drier wherein the conditions are adjusted for water removal, the passage of the film then being continued for a length of time and at a suitable temperature to meet the annealing conditions referred to hereinbefore. These may be carried out with the film still carried on the initial moving belt, or on the other hand, the film may be lifted therefrom, rolled or otherwise packaged and deposited in an annealing space under the conditions of annealing for improving the tensile strength and elongation properties as desired. Alternatively, the film may be deposited on a woven fabric or mat of non-woven fibers, water removed therefrom and annealing then carried out with the film coating the surface and interstices of the fabric to form a coated fabric or textile surface the entire body of which is subjected to the annealing procedure. The same is true of films laid down on paper or paper products such as carton boards and the like wherein the board supporting the film is subjected to the annealing process of heating for 1–120 minutes at 75–160° C.

Other alternative methods include the following:

(a) The film may be made on a form by dipping the form in the latex, with or without the use of a prior or subsequent coagulant dip, as in the manufacture of balloons, rubber gloves, etc.

(b) The latex may be added to a dispersion of fibers, as in beater addition in paper-making. The mixture is then formed into a mat, which is drained and dried.

(c) The latex can be sprayed onto a substrate, as in the manufacture of curled hair batts for packaging and upholstery materials.

(d) The latex can be foamed by the use of chemical evolution of gas or by whipping in air, and the resultant foam gelled by freezing and coagulating with an acid gas, e.g., $CO_2$ (the Talalay process). After heating to dry and anneal, a resilient foam is produced.

The following examples illustrate the process of the present invention.

EXAMPLE I

A latex was prepared containing about 61% by weight of a polystyrene-polyisoprene-polystyrene block copolymer having an intrinsic viscosity of 1.4 dl./g. and containing 35% by weight of bound styrene. The approximate block molecular weights were 33,000–100,000–33,000. Films were formed from this latex and water evaporated therefrom at ambient temperatures. In a constant temperature, forced air oven operated at 162–164° C. A portion of the film was annealed from 1 to 5 minutes. The following data were obtained on films prepared without this heat treatment compared with the tensile strength and elongation at break of heat treated samples. It will be seen from the following data that the samples of film which were heat treated as shown in the table achieve substantially higher tensile strength and elongation than film which had not been subjected to the annealing treatment.

TABLE I

|  | Heat Treatment | | | |
| --- | --- | --- | --- | --- |
|  | Not Annealed | Minutes Annealing | | |
|  |  | 1 | 3 | 5 |
| Tensile Strength at Break, p.s.i. | 83 | 355 | 535 | 565 |
| Elongation at Break, percent | 120 | 790 | 910 | 940 |

EXAMPLE II

The deleterious effect of relatively high annealing temperatures for prolonged periods are shown by the following data. It will be seen that temperatures of about 140° C. and higher for a period of ten minutes resulted in material degradation of the block copolymers which not only reduced their intrinsic viscosity but also degraded their physical properties. The block copolymer utilized for these tests has a structure Polystyrene—polyisoprene—polystyrene with molecular weights of 10,000–88,000–8,000, containing 21% by weight of polystyrene. The latex utilized for these tests was employed to form test films which were air dried at room temperature. The following table presents the data obtained.

TABLE II

|  | Room Temperature | 10 min. at ° C. | | |
| --- | --- | --- | --- | --- |
|  |  | 120 | 140 | 160 |
| Tensile strength at break, p.s.i. | 245 | 520 | 325 | 125 |
| Elongation at break, percent | 770 | 1,120 | 1,100 | 1,060 |
| Intrinsic viscosity, dl./g. | 0.79 | *0.74 | -------- | 0.59 |

*30 minutes.

EXAMPLE III

A third type of block copolymer was employed for the data contained in this example, the polymer had the structure Polystyrene—polyisoprene—polystyrene the molecular weights of the individual blocks being 12,000–86,000–16,000. The latex contained 61% by weight of the block copolymer. Films prepared from this latex were air dried at ambient temperature and then subjected to annealing times and temperatures shown in Table III below. The tensile strength and elongation at break attained with these various samples and with a sample not subjected to annealing are given in the table. The modulus of the films did not materially increase during any of the annealing, indicating that the increase in tensile strength is mainly due to increased elongation, namely that more coherent films were so formed.

TABLE III

| Sample | Annealing Temp., ° C. | Time (minutes) | Tensile Strength at p.s.i. | Elongation at Break, Percent |
| --- | --- | --- | --- | --- |
| A | Ambient | -------- | 295 | 420 |
| B | 80 | 15 | 1,260 | 860 |
| C | 80 | 60 | 2,200 | 960 |
| D | 100 | 5 | 2,500 | 1,000 |
| E | 120 | 15 | 2,350 | 1,010 |

We claim as our invention:

1. In the process of preparing films having improved tensile strength from a latex of hydrocarbon block copolymers having the general configuration

A—B—A wherein each A is a non-elastomeric polymer block of a mono-vinyl substituted arene having an average molecular weight of 5,000–75,000, and B is an elastomeric block of a conjugated diene having an average molecular weight of 35,000–125,000, said latex being laid down as a film and water evaporated therefrom, the improvement comprising annealing the film in the absence of curing agents for 5–60 minutes at 90–120° C. whereby the tensile strength thereof is substantially improved.

2. A process according to claim 1 wherein the A's are polystyrene blocks and B is a polyisoprene block.

3. A process according to claim 2 wherein the average molecular weight of each A is at least about 8,000.

4. A process according to claim 1 wherein the blocks A are polystyrene and block B is a polybutadiene.

References Cited

UNITED STATES PATENTS

| 3,068,187 | 12/1962 | Bolstad et al. | 260—879 |
| 3,078,254 | 2/1963 | Zelinski | 260—880 |
| 3,238,173 | 3/1966 | Bailey | 260—880 |
| 3,239,478 | 3/1966 | Harlan | 260—879 |
| 3,265,765 | 8/1966 | Holden | 260—880 |

ROBERT E. WHITE, *Primary Examiner.*

R. MOFFITT, *Assistant Examiner.*